United States Patent
Pjescic

(10) Patent No.: US 11,505,162 B2
(45) Date of Patent: Nov. 22, 2022

(54) FLUID CONNECTION FOR A WIPER BLADE AND SUCH A WIPER BLADE

(71) Applicant: Robert Bosch GmbH, Stuttgart (DE)

(72) Inventor: Ilija Pjescic, Belgrade (RS)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/201,561

(22) Filed: Mar. 15, 2021

(65) Prior Publication Data

US 2021/0291793 A1    Sep. 23, 2021

(30) Foreign Application Priority Data

Mar. 17, 2020 (DE) .................... 10 2020 203 427.3

(51) Int. Cl.
*B60S 1/52* (2006.01)
*B60S 1/48* (2006.01)
*B60S 1/38* (2006.01)

(52) U.S. Cl.
CPC ............. *B60S 1/524* (2013.01); *B60S 1/3805* (2013.01); *B60S 1/488* (2013.01)

(58) Field of Classification Search
CPC .... B60S 1/3803; B60S 1/3805; B60S 1/3886; B60S 1/3887; B60S 1/3894; B60S 1/488; B60S 1/524; B60S 1/522
USPC ............................ 15/250.04, 250.06, 250.07
See application file for complete search history.

(56) References Cited

U.S. PATENT DOCUMENTS

| | | | |
|---|---|---|---|
| 5,325,561 A * | 7/1994 | Kotlar ................... | B60S 1/3805 |
| | | | 219/202 |
| 10,202,105 B2 * | 2/2019 | Waible .................... | B60S 1/524 |
| 2015/0321645 A1 * | 11/2015 | Kleinsasser ........... | B60S 1/3848 |
| | | | 15/250.06 |
| 2018/0370497 A1 * | 12/2018 | Häfner .................... | B60S 1/488 |

FOREIGN PATENT DOCUMENTS

DE         102008020227       * 11/2009

* cited by examiner

*Primary Examiner* — Gary K. Graham
(74) *Attorney, Agent, or Firm* — Michael Best & Friedrich LLP

(57) ABSTRACT

Fluid connection (12) for a wiper blade (14) of a windshield wiping system, wherein a heating element (16) is arranged in a lumen (18) and protrudes from an opening (18) of the lumen (18), wherein a tubular sealing means (10) is able to be arranged on the opening (20) and closes the opening (20) in a fluid-tight manner and fixes the heating means (16).

11 Claims, 3 Drawing Sheets

FLUID CONNECTION FOR A WIPER BLADE AND SUCH A WIPER BLADE

BACKGROUND

The invention relates to a fluid connection for a wiper blade. The invention further relates to a wiper blade having a fluid connection.

Wiper blades which are part of a windshield wiping system of a motor vehicle and which are provided for wiping, for example, a windshield are known. The windshield of the vehicle to be wiped is moistened with cleaning fluid by means of a spray nozzle which is fixed to the engine hood and which is spaced apart from the wiper blade. The moistened windshield is cleaned by the wiper blade. To this end, the wiper blade performs an oscillating motion effected by the windshield wiping system whilst the cleaning fluid is applied. At the same time the applied cleaning fluid occasionally obscures the view through the windshield. The view through the windshield remains obscured until the wiper blade wipes away the cleaning fluid.

SUMMARY

It is proposed to provide a fluid connection for a wiper blade of a windshield wiping system, wherein a heating element is arranged in a lumen and protrudes from an opening of the lumen, wherein a tubular sealing means is arranged on the opening and closes the opening in a fluid-tight manner. At the same time the heating means is fixed. By means of the fluid connection, a wiper blade may be provided with spray nozzles which permit an application of the cleaning fluid directly onto the windshield. As a result, the obscured view through the windshield due to the cleaning fluid is reduced, since the fluid may be directly wiped away by the wiper blade. The cleaning fluid may be applied directly upstream of the wiper lip of the wiper blade, wherein the application is preferably carried out in the direction of movement, so that the fluid may be removed directly after the application. The lumen is to be understood as the clear width of a chamber and/or fluid line. Generally, the lumen is a cavity in the interior of a body. The opening connects the cavity to the external environment surrounding the body. The heating means serves to prevent the cleaning fluid from freezing. The heating means additionally heats the wiper blade and makes it flexible for the wiping process. The heating means in the lumen may be accessible through the opening, wherein the opening is protected by the sealing means against an entry of fluid and/or an exit of fluid. The opening is closed by the sealing means and at the same time the heating means is fixed, so that said heating means is not able to move out of the lumen. The heating means in this case is connected to a voltage source and/or earthing system. A controller may be provided for the heating means, the voltage source being connected to said controller. The power and the temperature of the heating means are determined thereby.

Advantageously the heating means may be a heating wire which is arranged in the lumen along a first fluid line and which exits from the lumen through the opening of the first fluid line and enters the lumen of a second fluid line. The heating means is partially arranged outside the lumen. Outside the lumen the heating means is at least partially covered by the sealing means. The sealing means is able to surround the heating means in a fluid-tight manner. As a result, the heating means is protected from environmental influences. The heating wire may also be a heating tape and/or a stranded wire. The heating means must any elongated heating means which is able to be arranged along the respective lumen. All of the previous and subsequent embodiments may be implemented by such alternative heating means.

Preferably the heating wire may be arranged in a single arrangement in the respective lumen and a loop-like connection may be configured between the fluid lines. A single arrangement inside the lumen means that the heating wire is not passed back in the same lumen, which would result in the heating wire being passed in a double arrangement along the same fluid line. The heating wire is passed merely in a single arrangement along the first line and exits at the opening thereof in order to enter the opening of the second fluid line and to be passed back in a single arrangement therein. In this case, the heating wire is passed at least indirectly to a voltage source or electrical earthing system of the vehicle.

So that a particularly effective protection of the heating means is achieved, the sealing means may be arranged along the path of the loop-like connection. In particular, when the heating wire exits and enters the respective openings of the fluid lines, the heating wire runs in a single arrangement from the one opening to the other opening and forms a type of loop, wherein the heating wire is preferably laid in a single arrangement in the respective fluid lines. Along the loop-like portion of the heating wire, which is arranged outside the fluid lines, the sealing means may run in a fluid-tight manner along the heating wire.

The sealing means may be slipped over at least one opening in a fluid-tight manner. The sealing means may fully enclose the opening. The sealing means may in each case seal an opening on two sides. If the sealing means is of tubular configuration, it is able to seal one respective opening with each end of its structure. Alternatively, it may also be inserted into the opening. Further alternatively, it may be slipped over the opening and at the same time a part of the sealing means may be inserted into the opening.

A preferred development may comprise a seal which assists the slipped-over part of the sealing means during the sealing process. In this case, the seal may increase the clamping action in the region of the slipped-over part so that the forces produced for the sealing process are increased relative to an embodiment without a seal.

It may be advantageous to use a seal which is configured as a sealing ring, wherein the sealing ring is arranged on a portion of the fluid line and, after the sealing means are arranged, is positioned between the sealing means and the fluid line. In this case the sealing ring may be configured in one piece with the material of the fluid line and may be configured, for example, as a peripheral collar. Alternatively, an O-ring may be arranged on the fluid line, the part which is able to be slipped over being pulled thereon. Further alternatively, a collar may be provided on the fluid line, a distal end of the sealing means abutting thereagainst and bearing thereagainst in a fluid-tight manner.

Alternatively or additionally, the seal may be a sealing ring which is arranged from the outside onto the slipped-over part. The sealing ring may additionally constrict the slipped-over part when it is tightly positioned. Preferably a separate sealing ring may be used. Alternatively, a sealing ring which is made in one piece from the same material as the remainder of the sealing means may also be incorporated therein, so that the sealing ring constitutes a reinforcement of the part which is able to be slipped-over, so that greater clamping forces are required in the elastic material of the sealing means for the widening and slipping-over process. These greater forces lead to an improved seal by the sealing means.

A sealing means in the manner of a heat-shrinkable tube results in a simple handling of the arrangement on the opening. To this end, the sealing means may be slipped onto the opening and then heated. This may be carried out at high cycle rates.

Preferably the opening is arranged on an extension of the fluid line. In this case, the extension may be tubular. An extension in the shape of a connecting piece may be used, the sealing means being slipped thereon. The extension may have a smaller diameter than the sealing means before it is heated in order to enable it to bear thereagainst in the manner of a heat-shrinkable tube.

The wiper blade may be provided with a fluid connection. In this case the fluid connection is arranged in the region of an adapter which serves for fastening the wiper blade to a wiper lever of a windshield wiping system. The fluid connection may also be arranged on the wiper lever so that the wiper blade has no fluid connection according to the previous embodiments. The fluid connection is connected to a plug connector and/or a bushing which is arranged on the wiper blade or the wiper arm in a complementary manner to the fluid connection, depending on the design. If the fluid connection is on the wiper blade, for example, a plug connector or a bushing may be arranged on the wiper arm, said plug connector or bushing also being connected when the adapter is connected to the wiper arm.

It goes without saying that the features mentioned above and yet to be described below may be used not only in the respectively specified combination but also in other combinations. The scope of the invention is only defined by the claims.

BRIEF DESCRIPTION OF THE DRAWINGS

The invention is described in more detail hereinafter by means of an exemplary embodiment with reference to the accompanying drawings.

In the drawings.

DETAILED DESCRIPTION

Figure 1:
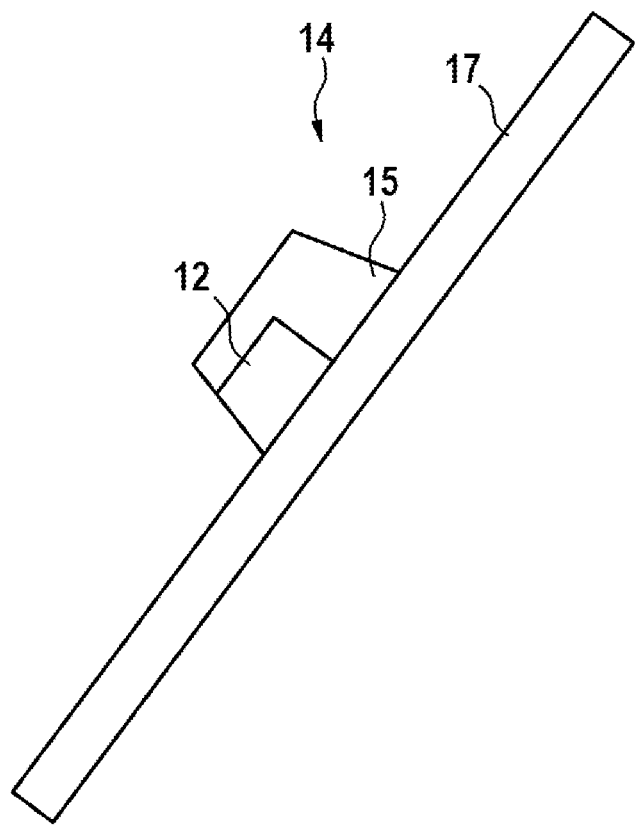
FIG. 1 shows a wiper blade with a fluid connection.

FIG. 1 shows a fluid connection 12 for a wiper blade 14 of a windshield wiping system of a motor vehicle. The windshield wiping system has a drive which is connected to a wiper lever. The wiper lever is releasably connected to the wiper blade 14 via an adapter 15. The fluid connection 12 is arranged in the region of the adapter 15. The wiper lever is able to conduct a cleaning fluid via fluid lines to the region of the adapter 15, where a plug connector or a bushing is connected to the fluid connection 12. The cleaning fluid may be conducted via the fluid connection 12 into a nozzle element, which is attached to the wiper blade 14, or into the wiper blade 14 where it is ejected from nozzles integrated in the wiper blade 14. The nozzles and/or nozzle elements spray the cleaning fluid onto the windshield, where it is wiped away by a wiper body 17 of the wiper blade 14. The wiper body 17 comprises a wiper lip made of rubber, for example.

Figure 2:
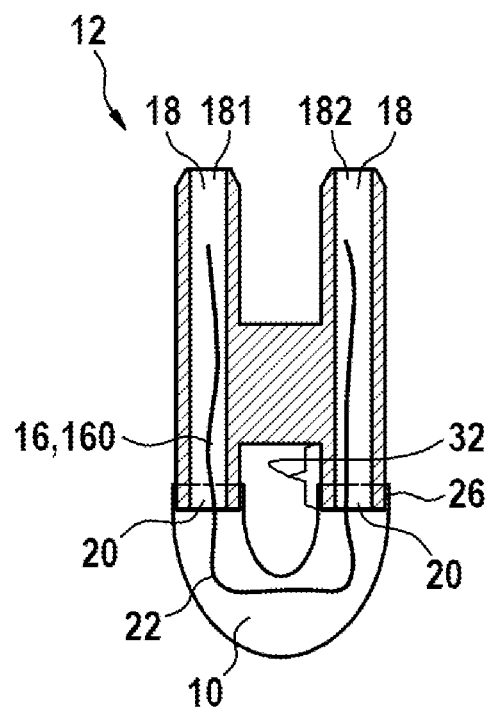
FIG. 2 shows a section through a fluid connection with a heating means.

FIG. 2 shows a fluid connection 12 in section. Two fluid lines 181, 182 are shown, the lumens 16 thereof extending continuously along the fluid lines 181, 182. The elongated lumens 16 are oriented approximately in parallel. It is not absolutely necessary that the lumens 16 are in parallel. The lumens may be at least partially not in parallel. The two fluid lines 181, 182 are integrated in the fluid connection 12 and connected together by at least one web. Moreover, openings 20 are formed at the distal ends of the fluid lines 181, 182. In each case one opening 20 is provided for each line 181, 182. A plurality of openings 20 may also be provided for each line. The openings 20 may face in the same direction. A heating means 16 which serves for heating the cleaning fluid and/or the fluid connection 12 is inserted into the lumens 18.

The heating means 16 may be a heating wire 160 or a heating tape. The heating wire 160 is arranged in the lumen 18 of the respective fluid line 181, 182 and extends along the fluid line 181, 182. The heating wire 160 is located in a single arrangement in the fluid line so that it extends from a voltage source or a connection for a voltage source through the lumen 18 of a first fluid line 181 and exits from the opening 20 assigned to the lumen 18, and then enters through the opening 20 of a second fluid line 182 into the lumen 18 thereof. In this case only one heating wire 160 runs through the respective lumens 18. The heating wire 160 exits from the fluid connection 12 between the two openings 20 of the fluid lines 181, 182. At the same time, the heating wire 160 forms a loop-like connection 22 which preferably runs in the manner of an arc from one opening 20 to the other opening 20.

An elongated sealing means 10, which in particular is tubular, is arranged along the connection 22 and encloses the heating means 16 fully and in a fluid-tight manner. The sealing means 10 also closes the openings 20 in a fluid-tight manner. One respective end of the sealing means 10 closes the openings 20. In this case an extension 32 which is preferably pipe-shaped extends from each fluid line 181, 182. The sealing means 10 is at least partially slipped over the extension 32.

The connection 22 and/or the sealing means 10 have a U-shaped basic structure so that a U-shaped path is produced from one opening 20 to the other.

Figure 3:
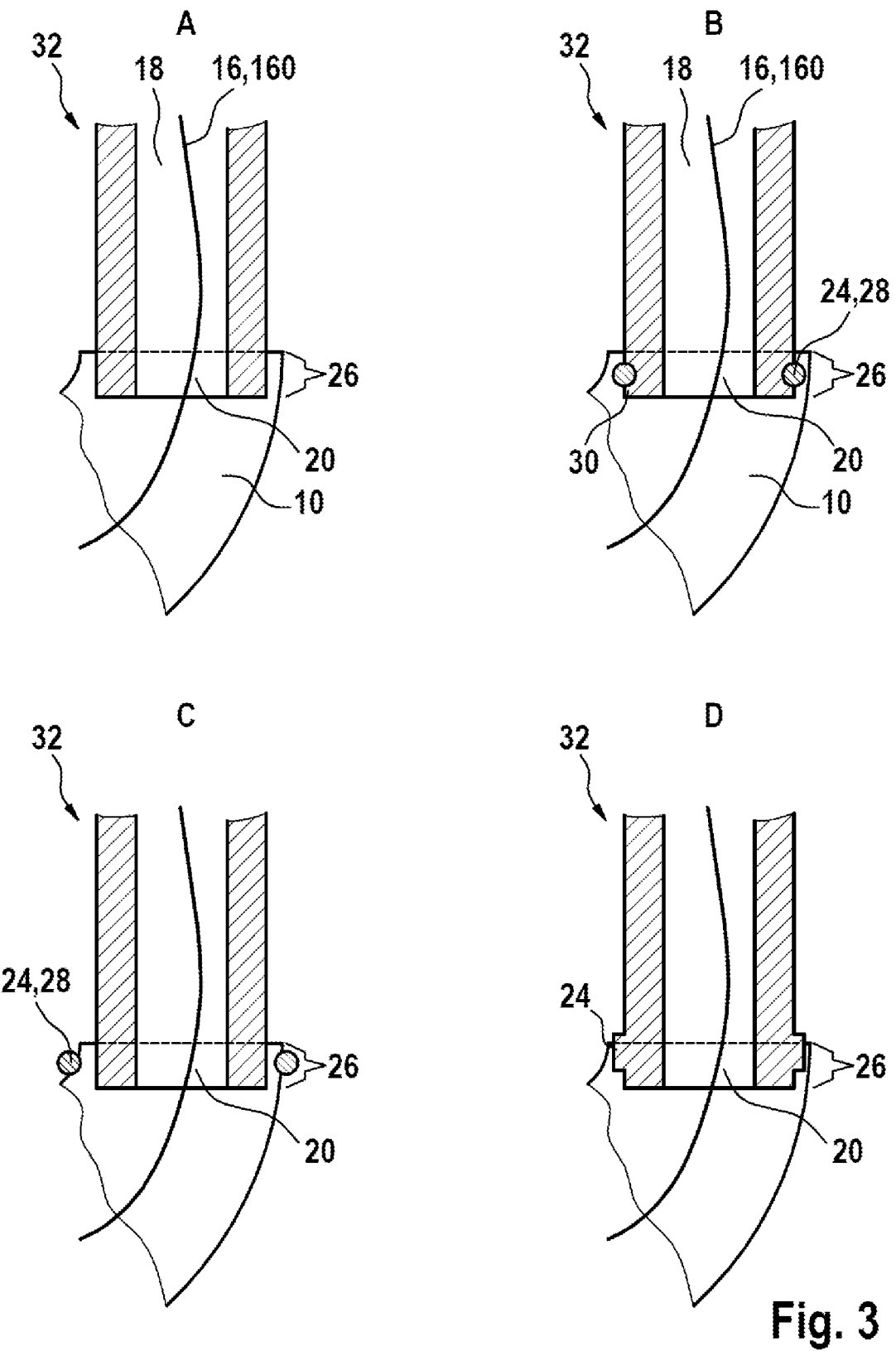
FIG. 3 shows a detailed drawing of a fluid line with a sealing means.

FIG. 3 shows various embodiments A to D of a slipped-over part 26 of the sealing means 10. The embodiments are able to be combined together in an unlimited manner.

FIG. 3A shows an extension 32 of the fluid line 181, 182 with an opening 20 for the lumen 18. The sealing means 10 is slipped over the extension 32 in the manner of a tube so that the opening 20 is closed in a sealed manner. The sealing means 10 together with the slipped-over part 26 encloses the opening 20 and the tubular extension 32 at the distal end of the fluid line and bears in a sealed manner against the wall of the extension 32.

FIG. 3B shows a development of FIG. 3A, wherein a seal 24 bears against the wall of the extension 32. The seal 24 ensures an additional sealing action of the slipped-over part 26. In this case, the seal 24 is arranged between the slipped-over part 26 and an internal portion 30 of the wall of the extension 32 which faces the slipped-over part 26. The seal 24 may be configured as a sealing ring 28. The sealing ring 28 is fitted on the extension 32 and bears in a sealed manner against the internal portion 30. The slipped-over part 26 is pulled over the internal portion 30 and the sealing ring 28.

The free end of the sealing means 10 in this case is spaced apart from the sealing ring 28, so that the sealing ring 28 is located internally. The seal 24 may be configured in the manner of an O-ring as a separate component. Alternatively or additionally, it may be configured in one piece with the sealing means 10 or the extension 32. It may also be configured as a bead which is arranged on the extension 32 or located internally in the sealing means 10. A plurality of seals 24 may be used.

FIG. 3C shows a further alternative seal 24 which is arranged externally on the sealing means 10 in the region of the slipped-over part 26. The seal 24 may be configured as a sealing ring 28 which seals the slipped-over part 26 from the outside. The sealing ring 28 constricts the slipped-over part and additionally seals it. The sealing ring 28 is spaced apart from the free end of the sealing means 10. The seal 24 of FIG. 3C may be combined with the seal of FIG. 3B, so that for example at least one sealing ring 28 is located externally and one sealing ring 28 is located internally. A plurality of sealing rings 28 may be used. The seals 24 may be configured as separate components or in one piece with the extension 16 and/or the sealing means 10.

FIG. 3D discloses an alternative seal 24 which is configured in one piece with the extension 32 and which projects from the internal portion 30. The seal 24 is spaced apart from the opening 20. After being arranged, the free end of the sealing means 10 ends up on the seal 24 and forms a sealed closure. To this end the seal 24 has a surface which is oriented radially outwardly and which extends approximately parallel to the wall of the fluid connection 181, 182. The longitudinal section relative to the extension 23 through the seal 24 would reveal, in particular, a rectangular cross section. The embodiment of FIG. 3D may be combined with the sealing rings 28 of FIGS. 3B and 3C, so that at least one sealing ring 28 may be additionally arranged on the outside and/or on the inside.

Figure 4:
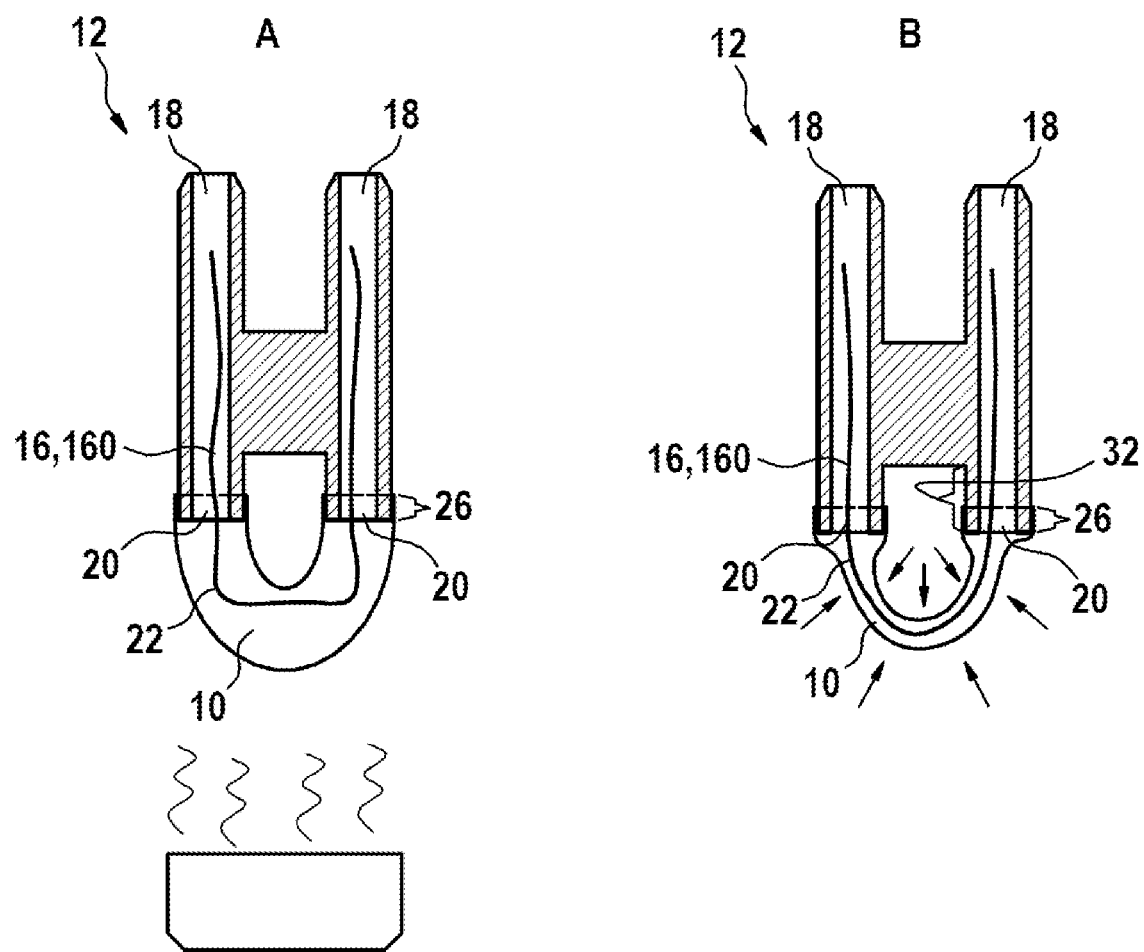
FIG. 4 shows a method for attaching a sealing means to the fluid line.

FIG. 4 discloses a method for sealing the sealing means 10 after introducing the heating means 16.

FIG. 4A shows the heating wire 160 in the fluid connection 12, wherein the connection 22 of the heating wire 160 is arranged between the lumens 18 in the sealing means. The sealing means 10 is not yet arranged in a sealed manner on the opening and/or the heating wire 160. The tubular sealing means 10 has an internal diameter which is at least the same size as, or greater than, the external diameter of the extension 32 such that the sealing means 10 may be slipped onto the extension 32. After the sealing means has been slipped on, a heat source 34 may be switched on or the sealing means 10 together with the fluid connection 12 may be brought into the vicinity of a heat source 34.

If a material which contracts when heated, such as for example a heat-shrinkable tube, is used as the sealing means 10, the sealing means 10 may be heat-shrunk by the heating process, wherein in this case the sealing means bears in a fluid-tight manner against the extension 32 and the heating wire 160 as in FIG. 4B. The slipped-over part in this case bears in a sealed manner against the internal portion 30 of the extension 26 and in the region of the opening 20 a tapered portion of the sealing means 10 is formed in the direction of the heating wire 22. In this case, the sealing means 10 bears in a fluid-tight manner against the heating wire, so that a fluid which fills the lumen 18 of the first and/or second fluid channel 181, 182 is not able to penetrate into the portion of the sealing means 10 accommodating the connection 22.

LIST OF REFERENCE NUMERALS

10 Sealing means
12 Fluid connection
14 Wiper blade
15 Adapter
16 Heating element
17 Wiper body
18 Lumen
20 Opening
22 Connection
24 Seal
26 Slipped-over part
28 Sealing ring
30 Internal portion
32 Extension
34 Heat source
160 Heating wire
161 First fluid line
162 Second fluid line

The invention claimed is:

1. A fluid connection (12) for a wiper blade (14) of a windshield wiping system, the fluid connection comprising:
a heating element (16) arranged in a lumen (18) of a fluid line (181, 182), the heating element protruding from an opening (20) of the lumen (18),
a tubular extension (32) in which the opening (20) is formed, and
a heat-shrinkable tube (10) having a part (26) slipped-over an exterior of the tubular extension (32) at the opening (20), wherein the heat-shrinkable tube (10) closes the opening (20) in a fluid-tight manner and in doing so fixes a position of the heating element (16).

2. The fluid connection (12) according to claim 1, characterized in that the heating element (16) is a heating wire (160) that is arranged in the lumen (18) along a first fluid line (181) and that exits from the lumen (18) through the opening (20) of the first fluid line (181) and enters a lumen (18) of a second fluid line (182).

3. The fluid connection (12) according to claim 2, characterized in that the heating wire (160) is arranged in a single arrangement in the respective lumen (18) and forms an arc-shaped connection (22) between the fluid lines (181, 182).

4. The fluid connection (12) according to claim 3, characterized in that the sealing means (10) is arranged along a path of the arc-shaped connection (22).

5. The fluid connection (12) according to claim 1, further comprising a seal (24) that provides an additional sealing action between the slipped-over part (26) of the heat-shrinkable tube (10) and the exterior of the tubular extension (32).

6. The fluid connection (12) according to claim 5, characterized in that the seal (24) is a sealing ring (28) that is arranged between the slipped-over part (26) of the heat-shrinkable tube (10) and a portion (30) of the tubular extension (32) that is received inside the slipped-over part (26).

7. The fluid connection (12) according to claim 5, characterized in that the seal (24) is a sealing ring (28) that is located externally on the slipped-over part (26).

8. The fluid connection (12) according to claim 7, characterized in that the sealing ring (28) is formed separate from the heat-shrinkable tube (10).

9. The fluid connection (12) according to claim 5, characterized in that the seal (24) is configured in one piece with the portion (30) of the tubular extension (32).

10. The fluid connection (12) according to claim 5, characterized in that the seal (24) is a sealing ring (28) formed separate from the tubular extension (32) and separate from the heat-shrinkable tube (10).

11. A wiper blade (14) having a fluid connection (12) according to claim 1.

* * * * *